United States Patent
Grabmann

(10) Patent No.: US 6,981,584 B2
(45) Date of Patent: Jan. 3, 2006

(54) SLAT CONVEYOR CHAIN

(75) Inventor: Peter Grabmann, Hollenbach (DE)

(73) Assignee: Joh. Winklhofer & Sohne GmbH und Co. KG, Munich (DE)

( * ) Notice: Subject to any disclaimer, the term of this patent is extended or adjusted under 35 U.S.C. 154(b) by 14 days.

(21) Appl. No.: 10/488,741

(22) PCT Filed: Jul. 23, 2002

(86) PCT No.: PCT/EP02/08195

§ 371 (c)(1),
(2), (4) Date: Jul. 9, 2004

(87) PCT Pub. No.: WO03/022712

PCT Pub. Date: Mar. 20, 2003

(65) Prior Publication Data

US 2004/0245076 A1    Dec. 9, 2004

(30) Foreign Application Priority Data

Sep. 5, 2001    (DE) ............................ 201 14 661 U

(51) Int. Cl.
B65G 17/06    (2006.01)
(52) U.S. Cl. ...................... 198/853; 198/850; 198/851; 198/852
(58) Field of Classification Search ............... 198/850, 198/851, 852, 853
See application file for complete search history.

(56) References Cited

U.S. PATENT DOCUMENTS

| | | | |
|---|---|---|---|
| 2,954,113 A | | 9/1960 | Hibbard et al. |
| 3,270,862 A | | 9/1966 | Goldberg |
| 3,738,478 A | * | 6/1973 | Tourtellotte ................. 198/851 |
| 3,870,142 A | * | 3/1975 | Woltjen ....................... 198/850 |
| 3,952,860 A | * | 4/1976 | Specht ........................ 198/701 |
| 4,096,943 A | * | 6/1978 | Gentsch ...................... 198/793 |
| 4,664,253 A | * | 5/1987 | Fahrion ....................... 198/851 |
| 5,042,648 A | * | 8/1991 | Garvey ........................ 198/853 |
| 5,307,923 A | * | 5/1994 | Damkjaer .................... 198/852 |
| 5,404,997 A | * | 4/1995 | Schreier et al. ............... 198/779 |
| 5,407,061 A | * | 4/1995 | Okada et al. ................. 198/812 |
| 5,697,492 A | * | 12/1997 | Damkj.ae butted.r ........ 198/852 |
| 5,797,820 A | * | 8/1998 | Endo ........................... 474/230 |
| 5,909,797 A | * | 6/1999 | Van Den Goor ......... 198/370.02 |
| 6,173,832 B1 | * | 1/2001 | Cockayne .................... 198/852 |

(Continued)

FOREIGN PATENT DOCUMENTS

DE      2713449      8/1978

(Continued)

Primary Examiner—Douglas Hess
(74) Attorney, Agent, or Firm—Marshall, Gerstein & Borun LLP

(57) ABSTRACT

A conveyor plate chain with chain links joined together in each case at a joint location and a plate conveyor connected to them consisting of a number of single plates, whereby each joint location is formed by a joint pin of one chain link and a joint sleeve of the adjacent chain link, the joint sleeve accommodating the joint pin, and a single plate is connected at a mounting location to a joint pin, and whereby outer chain links with parallel outer link-plates and parallel-arranged joint pins transverse with respect to the outer link-plates and inner chain links with inner link-plates arranged parallel within the outer link-plates and parallel-arranged joint sleeves transverse with respect to the inner link-plates alternate. The smallest center distance of two mounting locations of two adjacent single plates is larger than the center distance of two adjacent joint pins.

9 Claims, 1 Drawing Sheet

U.S. PATENT DOCUMENTS

| | | |
|---|---|---|
| 6,196,380 B1 * | 3/2001 | Teuber et al. ............... 198/853 |
| 6,250,459 B1 * | 6/2001 | Coen et al. ................. 198/852 |
| 6,527,106 B2 * | 3/2003 | Tanabe et al. .............. 198/853 |
| 6,666,327 B2 * | 12/2003 | Kilby et al. ................ 198/852 |
| 6,707,014 B1 * | 3/2004 | Corey et al. ................ 219/494 |
| 6,758,328 B2 * | 7/2004 | Arai et al. .................. 198/852 |

FOREIGN PATENT DOCUMENTS

DE   20014013 A1   1/2001

* cited by examiner

SLAT CONVEYOR CHAIN

REFERENCE TO RELATED APPLICATIONS

This disclosure claims the benefit of the filing date of International Application No. PCT/EP02/08195, having an international filing date of Jul. 23, 2002, which designated the United States of America, and this disclosure is the United States national stage of that international application. This disclosure further claims priority to Germany patent application 201 14 661.4, filed Sep. 5, 2001.

FIELD OF THE INVENTION

This invention relates to a conveyor plate chain with chain links connected together in each case at a joint location and a plate conveyor joined to them, consisting of a number of single plates, whereby each joint location is formed by a joint pin of the chain link and a joint sleeve of the adjacent chain link which accepts the joint pin and a single plate is connected to a joint pin at a mounting location.

BACKGROUND OF THE INVENTION

This type of conveyor plate chain is known, for example, from DE 295 05 477 U1. The conveyor plate chain described there consists of crimped chain links, which are all constructed the same, whereby at the narrower end a joint sleeve is pressed in through which in each case a joint pin extends, which is held on the opposite side by a locking ring. The other end of the joint pin is welded to a single plate of a plate conveyor. The single plate exhibits a circular arc-shaped recess on one face side, in which the matching other end of the adjacent plate engages with a slight gap, so that a plate conveyor, which is closed up as far as possible, is formed. In this illustrated embodiment each plate is joined to just one of the joint pins. Although this conveyor plate chain has the advantage that the plate conveyor extends parallel to the drive sprockets of the chain so that consequently a very flat plate-conveyor drive can be produced, the chain is lacking in terms of its stiffness and production costs.

SUMMARY OF THE INVENTION

It is therefore the object of this invention to provide a conveyor plate chain of the type mentioned at the start which does not exhibit these disadvantages.

In this respect, according to the invention, it specifies that outer chain links with parallel outer link-plates and parallel-arranged joint pins transverse with respect to the outer link-plates and inner chain links with inner link-plates arranged parallel within the outer link-plates and parallel-arranged joint sleeves transverse with respect to the inner link-plates alternate and the smallest center distance of two mounting locations of two adjacent single plates is larger than the center distance of two adjacent joint pins. In principle, a "normal" type of plate link chain with alternating inner and outer chain links is now used for the plate-conveyor chain. Just due to this, the stiffness of the chain is significantly increased compared to crimped chain links. Since no special parts need to be used for the chain links, the production costs can also be produced very economically. Furthermore, the conveyor plate chain also has the advantage that the center distance of two adjacent joint pins is not simultaneously the center distance of two mounting locations of the single plates. Here, chain links with a smaller pitch can be used for the drive of a plate conveyor with a larger pitch. The result of this is that with existing conveyor plate chain drives a new conveyor plate chain with the same size plate-conveyor is used, but which however needs a smaller tooth pitch and therefore ensures smoother running. Until now, where the mounting of the single plates occurred on the joint pins, the mounting distance was coupled directly to the center distance of the joint pins. With the version according to the invention, a type of transmission ratio can again be produced.

In this connection, it is favorable if the smallest center distance of two mounting locations from two adjacent single plates is greater by an integer multiple than the center distance of two adjacent joint pins. Depending on the design of the single plates, only every second or third or etc. joint functions as a full joint, whereas the intervening joints can be stiffened (e.g. due to the single-plate shape). In this respect, the chain behaves as if it exhibits a larger pitch for engaging a sprocket wheel.

The variant is particularly favourable in which a single plate is joined to a mounting point in each case with a single joint pin and only every second joint pin exhibits a joining location with a single plate. It follows that with the same plate conveyor a plate link chain with twice as small a pitch as with a previously employed conveyor plate chain with crimped chain links could be used.

According to one embodiment, a single plate can be joined exclusively to a single end section of a joint pin. The mounting occurs accordingly exclusively on one side on the joint pin. Through the use of non-crimped chain links, at least on one side the outer link-plates can act as a support or side tilt prevention.

For this purpose, it is of advantage if the single plates are in each case arranged perpendicular to the joint pins and parallel to the outer and inner link-plates of the chain links. Accordingly, the single plate can be joined very easily to an end section of a joint pin. Preferably, the fitting is provided through a pressed joint, but welding, soldering and sticking are also possible.

Furthermore, a traveling roller can in each case be arranged at a specified center distance on the joint sleeves and the specified center distance can correspond to the smallest center distance of two mounting locations of two adjacent single plates. Here, only one traveling sleeve is arranged in each case where a sprocket wheel is also intended to engage in later operation. Preferably, this occurs in the area of a fully formed chain joint, whose swivel movement within the operationally specified limits is not impaired by the plate conveyor.

In a favorable development, each second joint sleeve exhibits a traveling roller. An associated sprocket wheel then engages only each second intervening space of the chain links, whereby the wear due to the traveling roller, as with known roller chains, is minimized.

In a favourable manner, the arrangement of the travelling roller on the joint occurs such that its joint pin is connected to a single plate.

Furthermore, the invention relates to a conveyor plate chain drive with a conveyor plate chain and a sprocket wheel, whereby the pitch of the sprocket wheel is an integer multiple greater than the center distance of the joint pins of the plate-conveyor chain.

If, for example, the previously employed drive units for plate-conveyor chains are considered, which consist of a conveyor plate chain of crimped chain links, then this conveyor plate chain could in the case of a repair be replaced by a conveyor plate chain of the type according to the invention. Accordingly, no modification of the sprocket wheels or of other drive components would be necessary. This replacement principle is based on an idea which has until now not been reflected in the state of the art. Despite a different construction, the conveyor plate chain can be used any time on already existing parts of drive elements, in particular sprocket wheels on existing plate-conveyors. In particular, with regard to torsional stress, the conveyor plate chain according to the invention is however of a stronger design. In addition, such a chain can be produced using an existing assembly sequence, because no special parts are used.

In a further development it was possible to provide for the use of joint pins of equal length. Whereas the joint pins for fitting the single plates protrude on one side of the chain links, the chain pins, which are not necessary for such a fitting, could protrude on the opposite side of the chain links. They could, for example when fitting the single plates, be pressed through downwards. This could, of course, also occur previously. In most cases the occasional joint pins protruding downwards in the conveying channels will not disturb a conveyor plate chain and could also be employed in existing systems.

BRIEF DESCRIPTION OF THE DRAWINGS

In the following, an embodiment of the invention is explained in more detail based on a drawing. The following are shown.

DETAILED DESCRIPTION OF THE INVENTION

Figure 1:
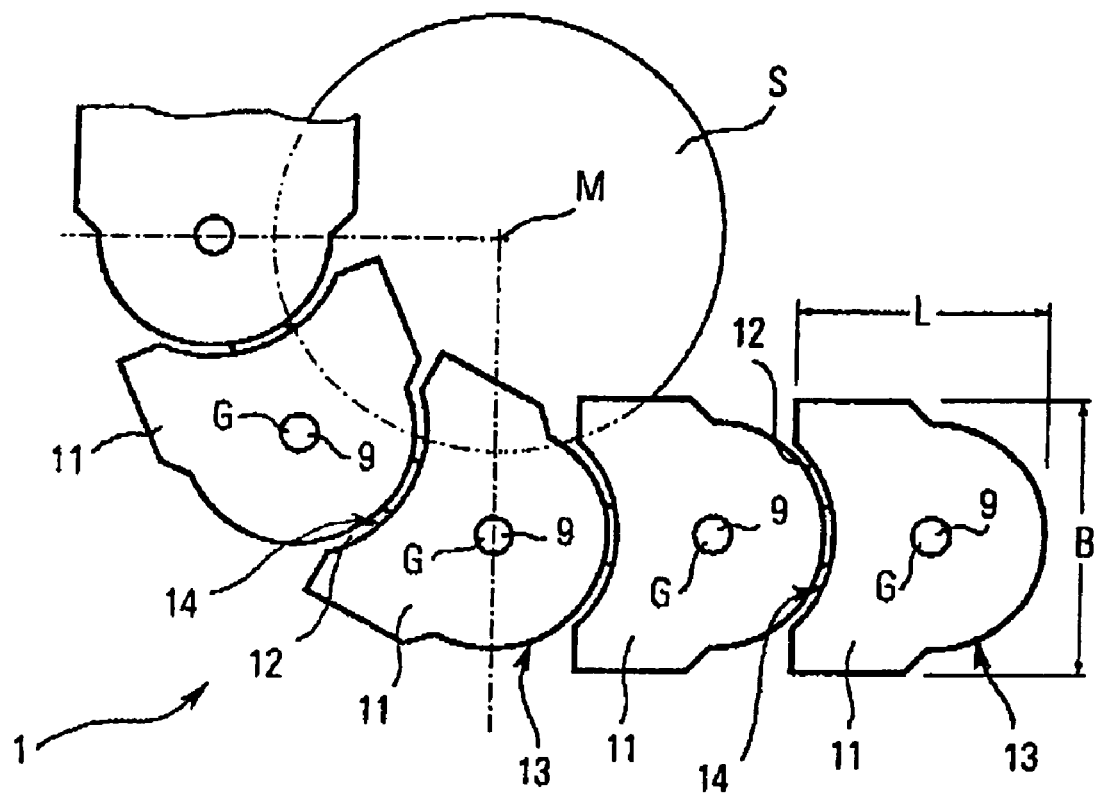
FIG. 1 a conveyor plate chain according to the invention in a plan view.

The conveyor plate chain 1 shown in the figures exhibits alternating inner chain links 2 and outer chain links 3 arranged in a row. The inner chain links 2 consist of two parallel, spaced inner link-plates 4 and two joint sleeves 5, spaced parallel to one another, which join them. The end sections of the joint sleeves 5 are in each case pressed into the inner link-plates 4 and run perpendicular to the inner link-plates 4. A rotatable travelling roller 6 is arranged on one of the joint sleeves 5.

The outer chain links 3 consist of two outer link-plates 7, spaced parallel from one another, and two joint pins 8 and 9 joining them, arranged parallel to one another. The joint pins 8 and 9 run perpendicular to the outer link-plates 7 and are pressed into them.

The outer link-plates 7 are in each case located outside or on the outer sides of the inner chain links 2. The joint pin 9 protrudes on one side over the outer side of the outer link-plate 7. A single plate 11, which is arranged parallel to the outer link-plate 7 on its outer side, is pressed onto this protruding end section 10. The single plate 11 extends then in its main direction at right angles to the joint pin axis. In each case, a joint pin 8 or 9 and a joint sleeve 5 together form a chain joint G or G'. The single plate 11 is realized thicker than the link-plates 4 or 7, so that a strong press fit with the end section 10 of the joint pin 9 can be provided.

Figure 2:
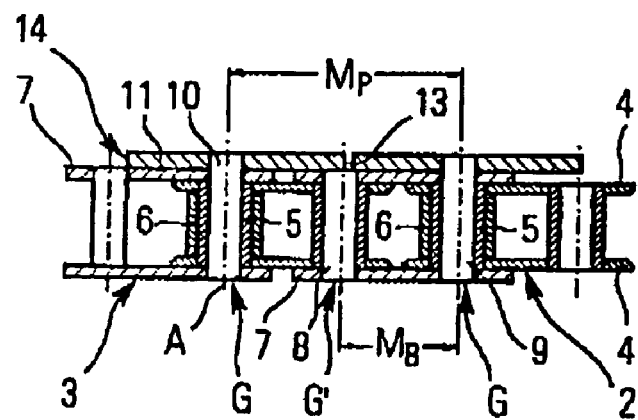
FIG. 2 the conveyor plate chain from FIG. 1 in a cross-section.

Based on FIG. 2 it can be seen that only every second joint pin 9 protrudes and is connected to a single plate 11. Precisely around this joint pin 9, a travelling roller 6 is also arranged in each case on the associated joint sleeve 5. The other joint sleeves 5 are in each case equipped without a travelling roller. The joint pins 8 are realised such that they do not exhibit any protrusion. However, here there is the possibility that the pins all exhibit the same length as the pins 9 and that in the region of the joints G' the protrusion is pressed through downwards so that these pins protrude on the opposite side. In this way, the number of different parts is again reduced.

The center distance $M_B$ is smaller by a factor 2 than the center distance $M_P$ of the end sections 10 mounted in the single plates 11 (mounting location of the single plates 11).

The pins 8, 9, the joint sleeves 5 and the travelling rollers 6 are realised with a cylindrical shape or as a cylindrical shell and the inner and outer link-plates 4 or 7 exhibit a shape known from normal roller chains.

In the plan view according to FIG. 1, the shape of the single plates 11 is illustrated and how they form a continuous conveyor. The single plates 11 exhibit a length L, which is slightly smaller than the center distance $M_P$ so that a gap 12 remains between the single plates 11. The width B of the single plates 11 is significantly larger than the width of the associated link-plates 4 and 7 of the inner chain links 2 and the outer chain links 3. The right face end 13 of the single plate illustrated in FIG. 1 is realized in a semi-circular shape, whereas the opposite face end 14 exhibits a recess, so that with the single plates 11 arranged in a row, the arc-shaped gap 12 is formed. The single plates 11 can then be swiveled about the joints G. The intervening joints G' are more significantly impaired in their swivel movement due to the design of the single plates 11. Swiveling can only occur within the scope of the width of the gap 12. This could be regarded as stiffening of the joints G'. In FIG. 1, the center point M of a sprocket wheel S, which engages the inner chain links 2, is shown diagrammatically. The pitch of this type of sprocket wheel S is such that the teeth only engage every second intervening space, so that the driving tooth face always comes into contact with a traveling roller 6, whereas the joint sleeve 5 without a traveling roller does not engage the sprocket wheel S.

Through this construction it is possible to use the chain according to the illustrated embodiment instead of a conveyor plate chain which previously exhibited chain links which were twice as long and their joints were spaced twice as far from one another (e.g. crimped conveyor plate chain according to DE 295 05 477 U1). The application of this type of new conveyor plate chain 1 therefore requires no modification stage, but can rather fall back on existing drive elements (in particular the existing sprocket wheels). In this way, this conveyor plate chain is very well suited to the replacement of an existing plate-conveyor chain, which is however not so torsionally stiff as the conveyor plate chain constructed according to the invention. Furthermore, the conveyor plate chain 1 according to the invention can be produced very simply, because no special elements (e.g. crimped link-plates) need to be used. The assembly process takes place similar as with a normal roller chain. Due to the fact that the plate-conveyor runs perpendicular to a drive axis of the driving sprocket wheels, flat installation can continue to be achieved. If, according to one variant, each second joint pin should protrude on the opposite side so that all joint pins exhibit the same length, then with the previously applied guidance designs (in particular guide rails or guide profiles) this does not represent a problem, because there is sufficient space available.

What is claimed is:

1. Conveyor plate chain (1), comprising chain links (2, 3) joined together in each case at a joint location (G, G'), a plate conveyor connected to the chain links (2, 3), comprising a number of single plates (11), each joint location (G, G') is formed by a joint pin (8, 9) of one chain link (3) and a joint sleeve (5) of the adjacent chain link (2), the joint sleeve accommodating the joint pins (8, 9), a single plate (11) is connected at a mounting location to a joint pin (9), outer chain links (3) with parallel outer link-plates (7) and parallel-arranged joint pins (8, 9) transverse with respect to the outer link-plates (7) and inner chain links (2) with inner link-plates (4) arranged parallel within the outer link-plates (7) and parallel-arranged joint sleeves (5) transverse with respect to the inner link-plates (4) alternate, the smallest center distance between two adjacent joint pins (9, 9) ($M_P$) of two adjacent single plates (11) is larger than the center distance (MB) of two adjacent joint pins (8, 9), and the joint pins (8, 9) are formed as full pins and in each case a single joint pin (9) on an end section (10), protruding at one side over outer sides of the outer link-plates (7) and formed for the mounting of the single plates (11), is joined to one of the single plates (11).

2. Conveyor plate chain (1) according to claim 1, wherein the smallest center distance ($M_P$) of two mounting locations of two adjacent single plates (11) is larger by an integer multiple than the center distance ($M_B$) of two adjacent joint pins (8, 9).

3. Conveyor plate chain (1) according to claim 1, wherein a single plate (11) is joined at a mounting location in each case to a single joint pin (9) and each joint pin (9) is joined with only one of the single plates (11), and wherein each joint pin (8) is not joined with the single plates 11.

4. Conveyor plate chain (1) according to claim 1, wherein a single plate (11) is joined exclusively to a single end section (10) of a joint pin (9).

5. Conveyor plate chain (1) according to claim 1, wherein the single plates (11) are in each case arranged perpendicular to the joint pins (9) and parallel to the outer and inner link-plates (4, 7) of the chain links (2, 3).

6. Conveyor plate chain (1) according to claim 1, and a traveling roller (6) is arranged in each case at a specified center distance on the joint sleeves (5) and the specified center distance corresponds to the smallest center distance ($M_P$).

7. Conveyor plate chain (1) according to claim 6, wherein every second joint sleeve (5) exhibits a traveling roller (6).

8. Conveyor plate chain (1) according to claim 7, wherein the traveling roller (6) is arranged on the joint location (G), the joint pin (9) of which is joined to a single plate (11).

9. Conveyor plate chain (1) according to claim 1, and a sprocket wheel (S), whereby the pitch of the sprocket wheel is greater by an integer multiple than the center distance ($M_B$).

* * * * *

UNITED STATES PATENT AND TRADEMARK OFFICE
CERTIFICATE OF CORRECTION

| | | |
|---|---|---|
| PATENT NO. | : 6,981,584 B2 | Page 1 of 1 |
| APPLICATION NO. | : 10/488741 | |
| DATED | : January 3, 2006 | |
| INVENTOR(S) | : Peter Grabmann | |

It is certified that error appears in the above-identified patent and that said Letters Patent is hereby corrected as shown below:

In the Claims:

Claim 1
Column 5, Line 13    Please delete "distance (MB) of" and replace with --distance ($M_B$) of--.

Signed and Sealed this

Twenty-first Day of November, 2006

JON W. DUDAS
*Director of the United States Patent and Trademark Office*